US008768857B1

(12) United States Patent
Bennett

(10) Patent No.: US 8,768,857 B1
(45) **Date of Patent: *Jul. 1, 2014**

(54) POSTAL SHIPPING LABEL

(71) Applicants: Stamps.com Inc., El Segundo, CA (US); iShip Inc., Atlanta, GA (US)

(72) Inventor: David Allison Bennett, Bothell, WA (US)

(73) Assignees: Stamps.com Inc., El Segundo, CA (US); iShip Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,334

(22) Filed: Dec. 10, 2012

Related U.S. Application Data

(60) Continuation of application No. 12/287,342, filed on Oct. 7, 2008, which is a division of application No. 10/211,802, filed on Aug. 1, 2002, now Pat. No. 7,458,612.

(60) Provisional application No. 60/309,915, filed on Aug. 1, 2001.

(51) Int. Cl.

| | |
|---|---|
| ***G06Q 30/00*** | (2012.01) |
| *G06Q 10/00* | (2012.01) |
| *G06F 17/00* | (2006.01) |
| *G07B 17/02* | (2006.01) |

(52) U.S. Cl.
USPC .............................. 705/330; 705/1.1; 705/401

(58) Field of Classification Search
CPC . G06Q 10/083; G06Q 10/08; G06Q 10/0833; G06Q 50/28; G06Q 10/0835; G06Q 50/30; G06Q 10/08355; G06Q 10/0834
USPC ...................... 705/1.1, 330, 400–416; 283/81
See application file for complete search history.

(56) References Cited

U.S. PATENT DOCUMENTS

| | | | |
|---|---|---|---|
| 4,660,221 | A | 4/1987 | Dlugos |
| 4,725,718 | A | 2/1988 | Sansone et al. |
| 4,743,747 | A | 5/1988 | Fougere et al. |
| 4,853,865 | A | 8/1989 | Sansone et al. |
| 5,319,562 | A | 6/1994 | Whitehouse |
| 5,413,383 | A | 5/1995 | Laurash et al. |

(Continued)

OTHER PUBLICATIONS

Federal Register, vol. 65, No. 232, pp. 75153-75580, Dec. 1, 2000.*

(Continued)

*Primary Examiner* — George Chen
(74) *Attorney, Agent, or Firm* — Khorsandi Patent Law Group, A Law Corporation; Marilyn R. Khorsandi

(57) ABSTRACT

The present invention provides apparatus, systems and methods for the computerized generation and printing of a U.S. Postal Service Shipping Label over the Internet that provides postage, shipping address, delivery address, and shipment and delivery tracking indicia. According to the invention, human-readable postage payment indicia is formatted in such a way that the actual price of shipping postage is obscured; postage payment can only be translated from the postage payment indicia by someone who knows the format template. The present invention further provides a United States Postal Service shipping label comprising a representation of paid postage, said representation of paid postage comprising a human-readable character string, said character string comprising imbedded postage price information. The present invention further provides a United States Postal Service shipping label, comprising a machine-readable representation of paid postage and a ship to address.

13 Claims, 8 Drawing Sheets

(56) References Cited

U.S. PATENT DOCUMENTS

| | | | | |
|---|---|---|---|---|
| 5,520,990 | A | | 5/1996 | Rotermund |
| 5,618,064 | A | | 4/1997 | Main |
| 5,712,787 | A | | 1/1998 | Yeung |
| 5,786,748 | A | * | 7/1998 | Nikolic et al. ............... 340/7.29 |
| 5,848,810 | A | | 12/1998 | Beaudoin et al. |
| 5,943,432 | A | | 8/1999 | Gilmore et al. |
| 5,944,461 | A | | 8/1999 | Kanbar |
| 5,988,897 | A | * | 11/1999 | Pierce et al. .................... 400/61 |
| 6,005,945 | A | | 12/1999 | Whitehouse |
| 6,010,156 | A | | 1/2000 | Block |
| 6,213,518 | B1 | | 4/2001 | Raming |
| 6,233,565 | B1 | | 5/2001 | Lewis et al. |
| RE37,521 | E | | 1/2002 | Laurash et al. |
| 6,408,286 | B1 | | 6/2002 | Heiden |
| 6,424,954 | B1 | | 7/2002 | Leon |
| 6,525,835 | B1 | | 2/2003 | Gulati |
| 6,526,393 | B1 | | 2/2003 | Fredman |
| 6,557,755 | B1 | | 5/2003 | Pickering, Jr. et al. |
| 6,594,374 | B1 | | 7/2003 | Beckstrom et al. |
| 6,616,189 | B2 | | 9/2003 | Raming |
| 6,636,837 | B1 | | 10/2003 | Nardozzi et al. |
| 6,701,304 | B2 | | 3/2004 | Leon |
| 6,722,563 | B1 | | 4/2004 | Johnson et al. |
| 6,817,517 | B2 | | 11/2004 | Gunther |
| 6,889,194 | B1 | | 5/2005 | Kadaba |
| 6,925,451 | B1 | | 8/2005 | Bailey et al. |
| 6,982,808 | B1 | | 1/2006 | Ogg et al. |
| 7,025,268 | B2 | | 4/2006 | Alleshouse |
| 7,085,725 | B1 | | 8/2006 | Leon |
| 7,458,612 | B1 | | 12/2008 | Bennett |
| 7,831,518 | B2 | | 11/2010 | Montgomery |
| 8,240,579 | B1 | | 8/2012 | Bennett |
| 2002/0010689 | A1 | | 1/2002 | Tibbs et al. |
| 2002/0013744 | A1 | | 1/2002 | Tsunenari et al. |
| 2002/0074417 | A1 | | 6/2002 | Dlugos |
| 2002/0080395 | A1 | | 6/2002 | Kurashina |
| 2002/0165729 | A1 | | 11/2002 | Kuebert et al. |
| 2003/0078893 | A1 | | 4/2003 | Shah et al. |
| 2003/0101143 | A1 | | 5/2003 | Montgomery et al. |
| 2003/0167179 | A1 | | 9/2003 | Briley |
| 2003/0217017 | A1 | | 11/2003 | Willoughby et al. |
| 2004/0070194 | A1 | | 4/2004 | Janetzke et al. |
| 2004/0186811 | A1 | | 9/2004 | Gullo et al. |
| 2005/0125367 | A1 | | 6/2005 | Ogg et al. |
| 2005/0138469 | A1 | | 6/2005 | Ryan, Jr. et al. |
| 2005/0248148 | A1 | | 11/2005 | Schenck et al. |

OTHER PUBLICATIONS

Federal Register, vol. 65, No. 191, pp. 58682-58698, published Oct. 2, 2000.

United States Postal Service, "Information Based Indicia Program (IBIP) Performance Criteria for Information-Based Indicia and Security Architecture for Closed IBI Postage Metering Systems", Jan. 12, 1999.

Meter Stamp Society, http://www.meterstampsociety.com/gallery/PCDated. html, © 2004-2005, dated Dec. 22, 2008, retrieved Dec. 6, 2010.

Office Action dated Jun. 21, 2005 for U.S. Appl. No. 10/211,802, filed Aug. 1, 2002, pp. 1-10.

Office Action dated Jun. 8, 2006 for U.S. Appl. No. 10/211,802, filed Aug. 1, 2002, pp. 1-11.

Office Action dated Jan. 17, 2008 for U.S. Appl. No. 10/211,802, filed Aug. 1, 2002, pp. 27.

Notice of Allowance dated Aug. 20, 2008 for U.S. Appl. No. 10/211,802, filed Aug. 1, 2002, pp. 1-4.

Final Office Action dated Jul. 6, 2011 for U.S. Appl. No. 12/287,342, filed Oct. 7, 2008, pp. 1-13.

Notice of Allowance dated May 8, 2013 for U.S. Appl. No. 12/287,342, filed Oct. 7, 2008, pp. 1-8.

Notice of Allowance dated Apr. 18, 2012 for U.S. Appl. No. 12/287,984, filed Oct. 15, 2008, pp. 1-10.

David Allison Bennett, U.S. Appl. No. 12/287,342, filed Oct. 7, 2008, Preliminary Amendment, pp. 1-6.

* cited by examiner

FIG. 7

| Data Element | Size (places) |
|---|---|
| • Postage value | 6 |
| • Rate category | 4 |
| • Weight in pounds and ounces | 4 |
| • Begin Descending Register Value | 8 |
| • End Descending Register Value | 8 |
| • Unique identifier for each piece per session | 12 |
| • Customer authorization number | 6 |

81

28

FIG. 8

| Data Element | Length |
|---|---|
| • Postage value | 6 |
| • Date | 4 |
| • Delivery ZIP code (optional) | 9 |
| • Unique Identifier (optional) | 12 |
| • Customer Authorization Number (optional) | 6 |

81

28

FIG. 9

FIG. 10
82
optional advertising art area
ATLANTA,GA 30328
MAR 20 2000
28
US POSTAGE
003200
12345678901234
81
PARCEL POST
JOHN DOE
(425) 555-5555
CODING DEPARTMENT
SUITE XXX
9999 999TH AVENUE NE
BELLEVUE WA 98005-1885
MAR 20 2000
15 LBS
NON-MACHINABLE
1 OF 1
USPS DELIVER TO:
MARK LEWIS - (404) 555-5555
CUSTOM AUTO
BLDG 3 4TH FLOOR
9999 ANYPLACE DR NE
ATLANTA GA 30328-3474
USPS DELIVERY CONFIRMATION
0399 9999 9999 9997 6542
REF #1 12345678901234567890123456789​0
REF #2 123456789012345678901234567890
ISH 1.00

FIG. 11
82
optional advertising art area
ATLANTA,GA 30328
MAR 20 2000
US POSTAGE
003200
12345678901234
28
81
PRIORITY MAIL
JOHN DOE
(425) 555-5555
CODING DEPARTMENT
SUITE XXX
9999 999TH AVENUE NE
BELLEVUE WA 98005-1885
MAR 20 2000
15 LBS
1 OF 1
USPS DELIVER TO:
MARK LEWIS - (404) 555-5555
CUSTOM AUTO
BLDG 3 4TH FLOOR
9999 ANYPLACE DR NE
ATLANTA GA 30328-3474
USPS DELIVERY CONFIRMATION
0399 9999 9999 9997 6542
REF #1 123456789012345678901234567890
REF #2 123456789012345678901234567890
ISH 1.00

POSTAL SHIPPING LABEL

CROSS-REFERENCE TO RELATED APPLICATIONS

This application is a continuation application of, and claims priority to, U.S. application Ser. No. 12/287,342 (filed Oct. 7, 2008; entitled "POSTAL SHIPPING LABEL"), which is a divisional application of, and which claims priority to, U.S. application Ser. No. 10/211,802 (now Issued U.S. Pat. No. 7,458,612; filed Aug. 1, 2002; entitled "POSTAL SHIPPING LABEL"), which claims priority to U.S. Provisional Patent Application Ser. No. 60/309,915, entitled "Postal Shipping Label", filed: Aug. 1, 2001, the entire disclosures of all of which are incorporated by reference herein for all purposes as if fully stated here.

FIELD OF THE INVENTION

The field of the present invention is shipping labels, and specifically computer-generated postal shipping labels over the Internet.

BACKGROUND OF THE INVENTION

Many shipping users often choose private carriers, such as FedEx, DHL and others, as opposed to the U.S. Postal Service for shipping packages. Shipping packages using these private carriers may cost more than shipping a package through the U.S. Postal Service. However, private carriers offer online services over the Internet that provide for online ordering and local client printing of shipping labels that allow the user to track the status of shipment and delivery. Except for Express Mail and a few special shipping classes, the U.S. Postal Service has historically not provided computerized tracking technology, such as for regular shipping.

The computerized generation and printing of U.S. postage over the Internet is well known in the art. Internet postage provides the printing of "stamps" as well as from and to address labels. A way is needed so that an individual user can request over the Internet the generation and printing at a printer configured with the user's client computer of a U.S. Postal Service ("USPS") shipping label that provides not only postage and address labels, but also provides for shipment and delivery tracking.

SUMMARY OF THE INVENTION

The present invention provides apparatus, systems and methods for the computerized generation and printing of a U.S. Postal Service Shipping Label, such as over the Internet, that provides postage, shipping address, delivery address, shipment and/or delivery tracking indicia. In one exemplary embodiment of the invention, human-readable postage payment indicia is provided and is formatted in such a way that the actual price of shipping postage is obscured; postage payment can only be translated from the postage payment indicia by someone who knows the format template. The present invention further provides a United States Postal Service shipping label comprising a representation of paid postage, said representation of paid postage comprising a human-readable character string, said character string comprising imbedded postage price information. The present invention further provides a United States Postal Service shipping label, comprising a machine-readable representation of paid postage and a ship to address.

Herein, the term "postage price" is equivalent in meaning to the term "shipping price".

FACSIMILE REPRODUCTION OF COPYRIGHT MATERIAL

A portion of the disclosure of this patent document contains material which is subject to copyright protection by the copyright owner, Stamps.com Inc. Stamps.com Inc. has no objection to the facsimile reproduction by anyone of the patent document or the patent disclosure, as it appears in the Patent and Trademark Office patent file or records, but otherwise reserves all copyright rights whatsoever.

BRIEF DESCRIPTION OF THE DRAWINGS

These and other features of the present invention are more fully set forth in the following description of exemplary embodiments of the invention. The description is presented with reference to the accompanying drawings in which:

FIG. 7 is a graphic representation of an exemplary Additional Service Indicator segment depicting an exemplary Vendor Identification string;

FIG. 8 is a graphic representation depicting an exemplary template for an exemplary format of a payment indicia string;

FIG. 9 is a graphic representation depicting an exemplary alternative template for an exemplary alternative format of a payment indicia string;

DETAILED DESCRIPTION OF EXEMPLARY EMBODIMENTS OF THE INVENTION

The invention obtains user-supplied shipping information, including package-specific information including package weight and dimensions, shipping address, delivery address, and the requested USPS Service (e.g., USPS Priority, USPS Parcel Post, USPS Priority Mail) with which to prepare USPS shipping labels through an online Internet-based user interface such as disclosed in U.S. application Ser. No. 09/905,329 filed on Jul. 13, 2001 entitled "Web-Enabled Value Bearing Item Printing" that has been or shall be assigned to Stamps.com, one of the assignees of the present application, the disclosure of which is incorporated in full herein by reference as if fully stated here.

Using the user-supplied shipping information, the invention obtains shipping rates for the requested USPS Service such as is disclosed in International Application No. PCT/US01/09852, entitled "Apparatus, Systems and Methods for Online, Multi-Parcel, Multi-Carrier, Multi-Service Parcel Returns Shipping Management", International Filing Date Mar. 27, 2001, the disclosure of which is incorporated in full herein by reference as if fully stated here.

Using the user-supplied shipping information, and the calculated shipping rates for the requested USPS Service, the exemplary embodiment of the invention formats and generates for printing a USPS shipping label, an exemplary embodiment of which is depicted in FIGS. 1-4, with several label segments:

1.) Payment segment 1
2.) Service indicators 2*a*-2*b*
3.) Ship From address 3
4.) Ship To address 4
5.) Package information 5
6.) Tracking Number/Routing Barcode 6
7.) Additional Service Instructions 7

Each of the above-mentioned label segments is explained in more detail below. Barcodes in the exemplary embodiment of the invention are formatted and generated according to the standards described in Appendix A hereto, which is a part hereof.

It will be understood by someone with ordinary skill in the art that the description of barcodes in the exemplary embodiment is illustrative of machine readable codes and symbologies and similar technologies, including bar codes, matrix codes, digital watermarks, conventional metered payment indicia from meters, magnetic strips, magnetic chips, and the like; the description of barcodes in the exemplary embodiment is not a limitation of the invention. As will be understood by someone with ordinary skill in the art, the present invention is not limited to machine-readable technologies described herein or now known, but would be equally applicable to machine readable technologies not now known or not described herein provided that the machine readable indicia provided by such technologies can be printed on, affixed to, deposited on, or otherwise displayed on a shipping label.

Payment and Service Indicators

Figure 1:
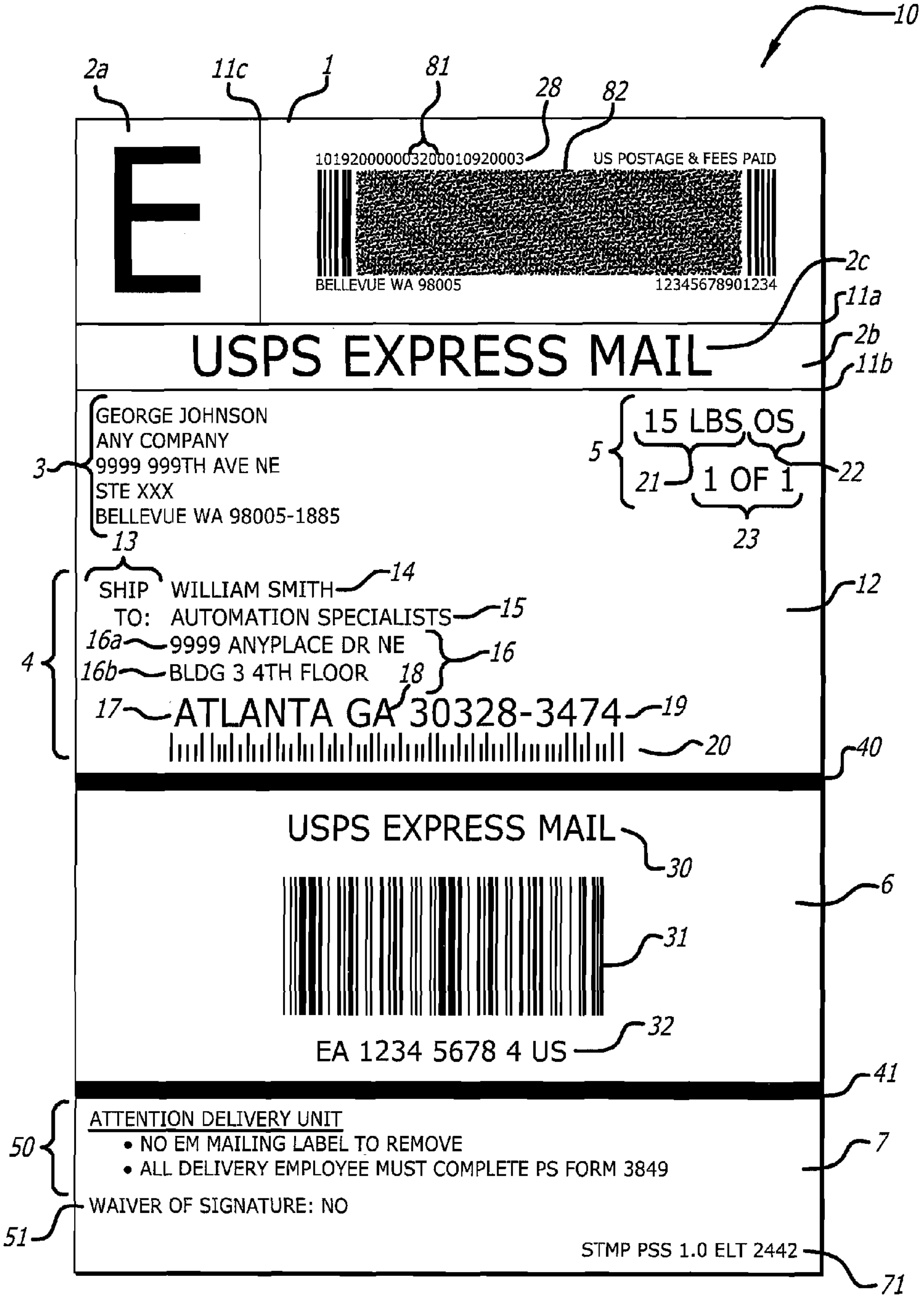
FIGS. 1 through 4 are graphic representations of exemplary USPS shipping labels formatted, generated and printed using an exemplary embodiment of the present invention.
Figure 2:
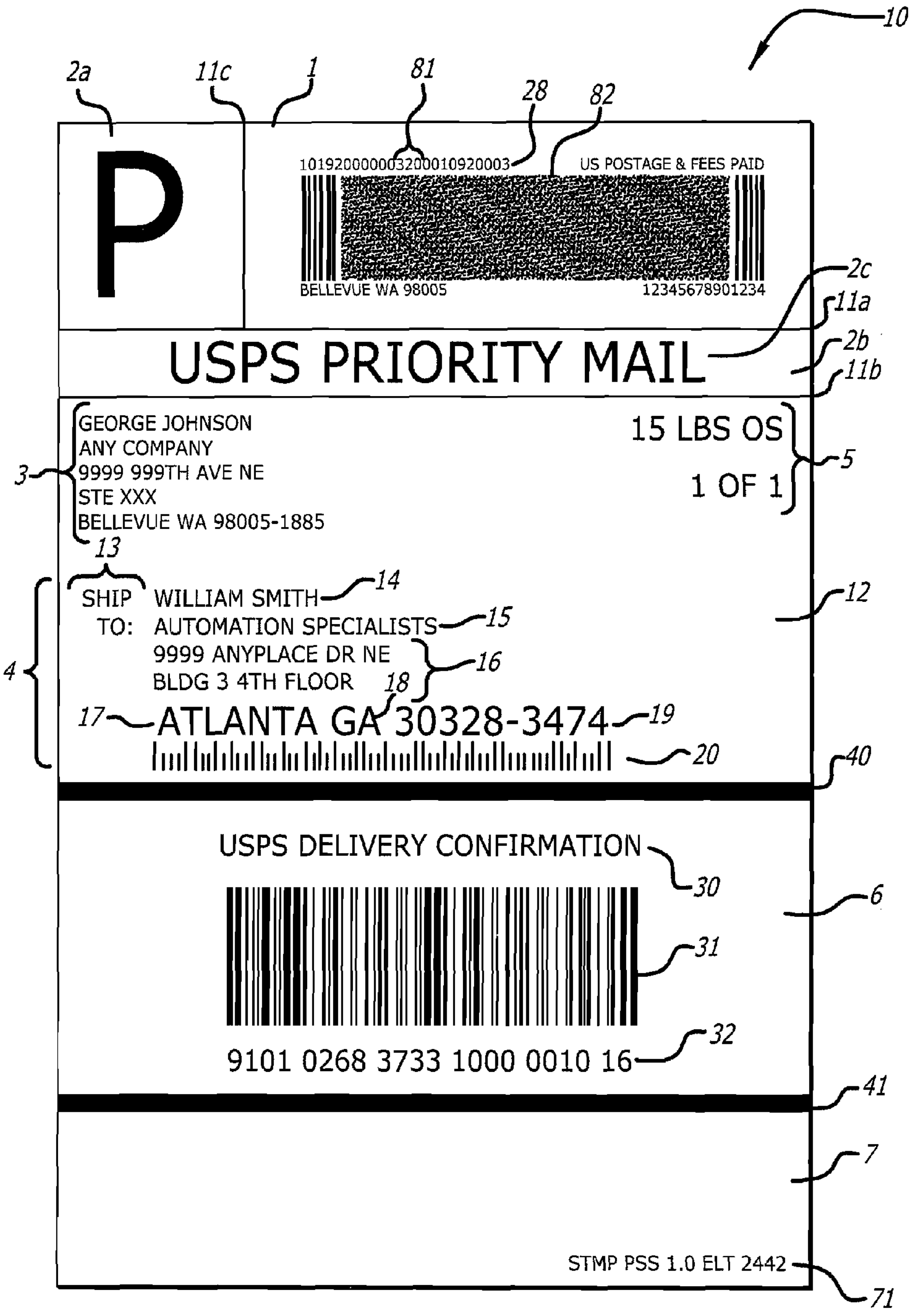
Figure 3:
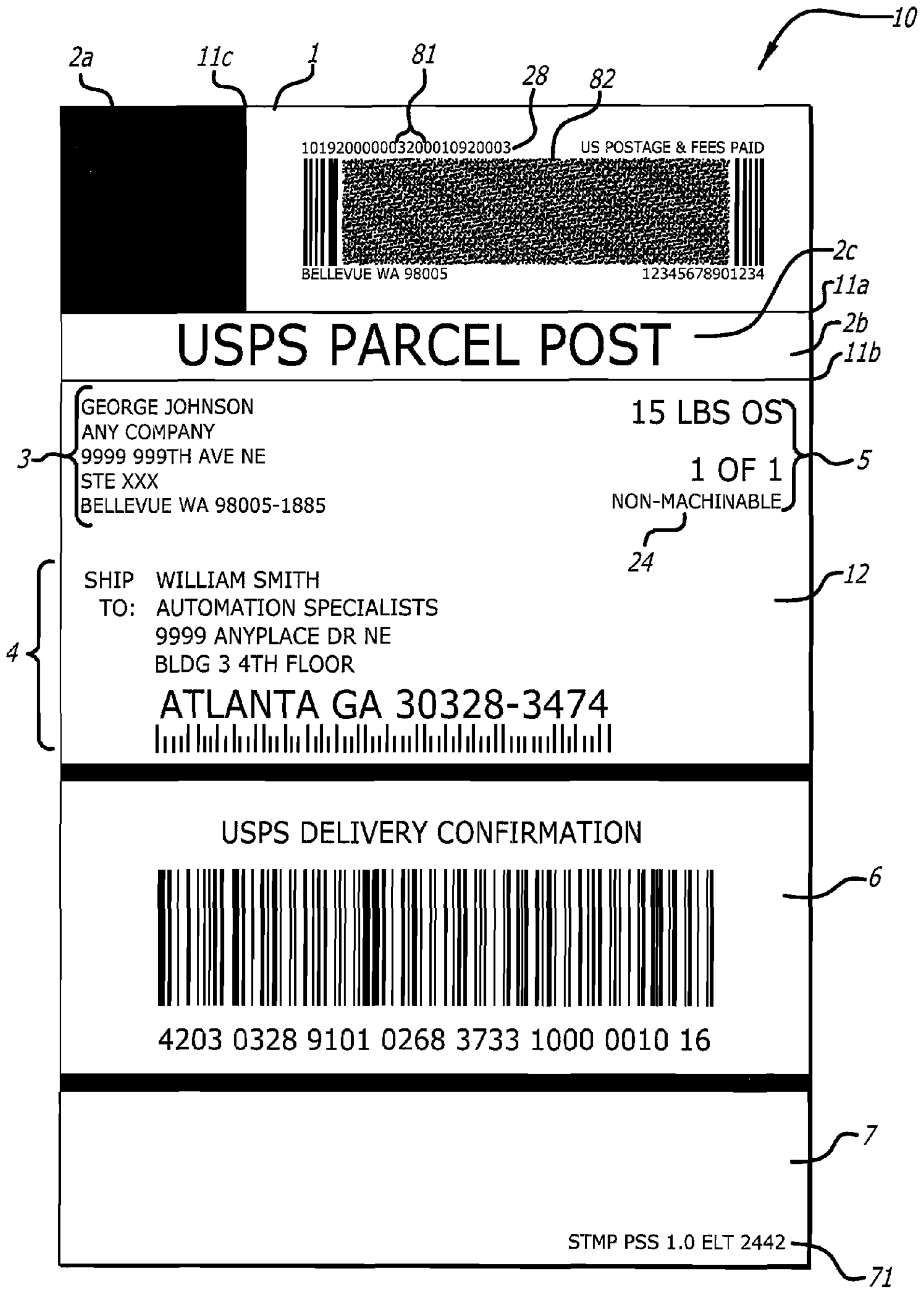
Figure 4:
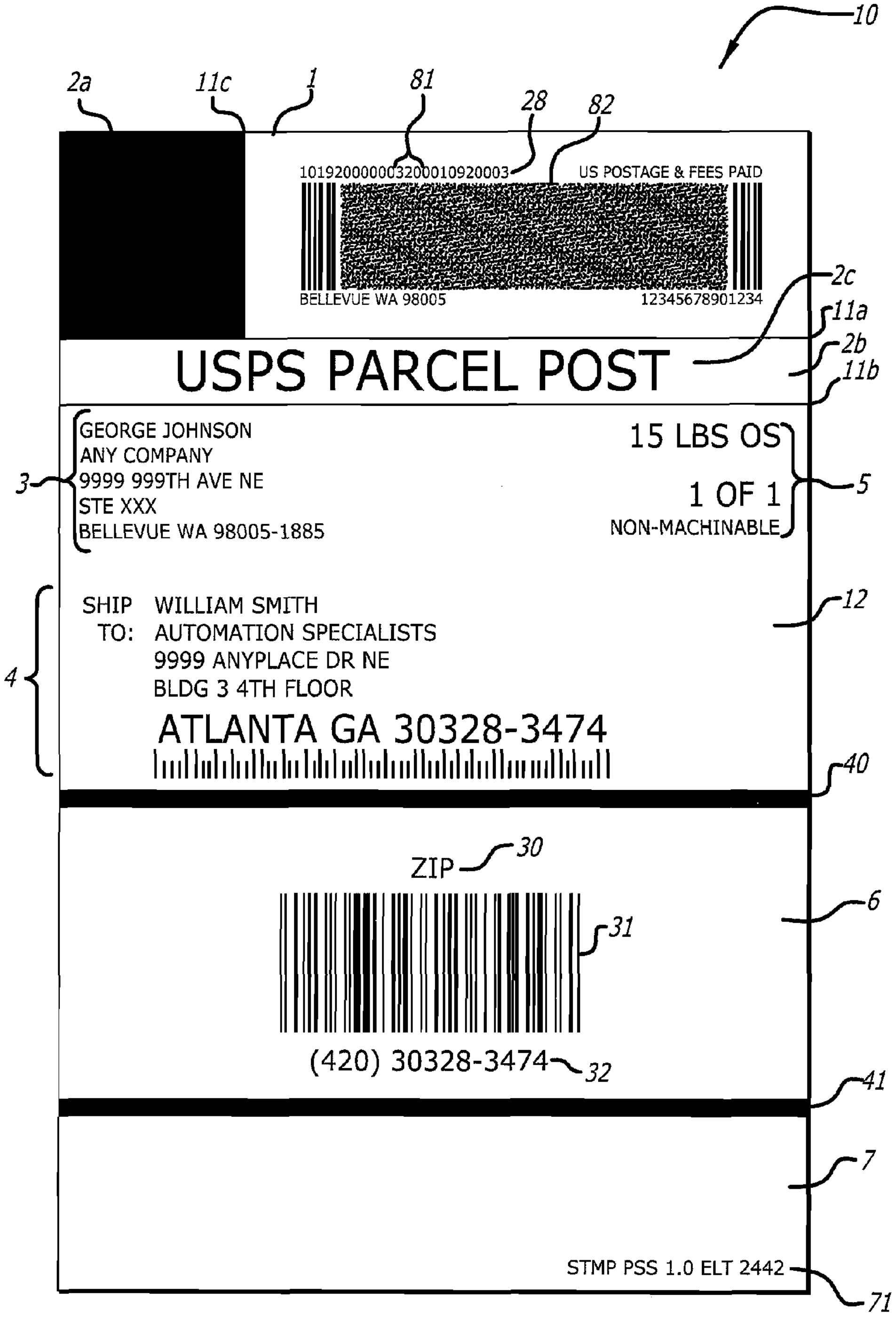
Figure 5:
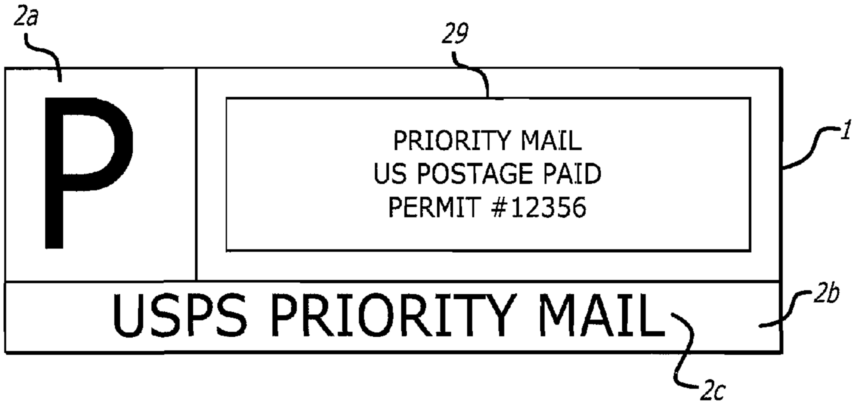
FIGS. 5 and 6 are graphic representations of exemplary Payment and Service Indicator segments in an exemplary embodiment of the invention.
Figure 6:
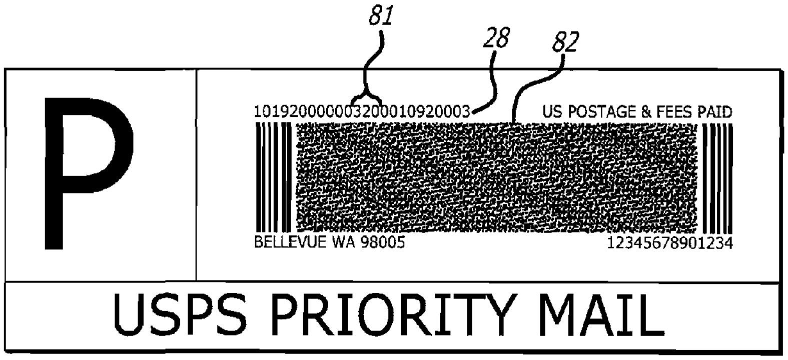

As depicted in FIG. 1 and FIG. 5, the first two segments of the exemplary USPS shipping label are the Payment segment 1 and Service Indicators 2*a*-2*c*. It will be understood by someone with ordinary skill in the art that the description of a "Payment segment" in the exemplary embodiment is illustrative of a representation of paid postage; use herein of the term "Payment segment" is not a limitation of the invention. The Payment segment 1 is in the upper right corner of the shipping label bordered by Service Indicators 2*a*-2*c*, namely, the Service Icon 2*a* on the left and Service Name segment 2*b* and Service Name text 2*c* on the bottom.

Payment Indicia

The invention generates, according to a particular user's request, an exemplary Payment segment 1 to contain any one of several forms of payment indicators supported by the USPS, including but not limited to: Permits, Express Mail Corporate Accounts and PC Postage (Information Based Indicia—"IBI"). FIGS. 1-4 depict a bar-coded payment indicia 82. The invention prepares and generates Bar-coded payment indicia 82 in a manner such as disclosed in U.S. application Ser. No. 09/690,243, filed Oct. 17, 2000, entitled "Method and Apparatus for Online Value-Bearing Item System, the disclosure of which is incorporated in full herein by reference as if fully stated here. FIG. 5 is a graphic representation of an exemplary Payment segment 1 depicting a Permit payment indicia 29.

The invention detects whether the form of payment, input by the user, is supported by the USPS. The invention further detects whether the form of payment, input by the user, is supported by the application producing the shipping label. In the event that the USPS does not support the user-input form of payment and/or in the event that the shipping label application does not support the user-input form of payment, the invention generates a Payment segment 1, formatted and positioned as a blank block, so that a meter strip can be placed over the blank block without obscuring the rest of the label.

In the exemplary embodiment, the invention formats the Payment Segment as one inch (1") high and three inches (3") wide.

In the exemplary embodiment, Payment Information for Express Mail Corporate Accounts and IBI PC Postage are displayed in addition to a machine-readable bar-coded payment indicia 82 to include human-readable payment indicia 81. As depicted in the exemplary embodiment shown in, e.g., FIGS. 1-4, the invention imbeds human-readable payment indicia 81 in a long string of characters 28. In the exemplary embodiment, the invention generates a human-readable string of characters 28 and generates an electronic representation of the human-readable string of characters 28 for printing. Imbedding human-readable payment indicia 81 in a long string of human-readable characters 28 obscures the actual postage cost from the recipient.

In an alternative exemplary embodiment, no human-readable representation of postage price information is printed or otherwise displayed on the shipping label; rather, a machine-readable representation of an amount of paid postage is the only representation of the paid postage amount on the label; the amount of paid postage not being otherwise represented on the label.

FIG. 8 depicts an exemplary template for the format of the human-readable character string 28 including the payment indicia string 81. The exemplary embodiment provides the means of verification of postage amount by computing the difference between the beginning and ending descending register values. The postage bar code indicia will not include a postage value representation but will include a customer authorization number.

FIG. 9 depicts an exemplary alternative template for an exemplary alternative format of a human-readable character string 28 including the payment indicia string 81. This alternative exemplary embodiment leverages the security of the digital signature and thereby permits the printing of the postage value and date on the delivery label instead of in the bar code indicia. In other embodiments, other elements could be added, such as unique identifiers and delivery ZIP codes. The postage bar code indicia will not include a postage value representation but will include a customer authorization number.

Figure 10:
FIG. 10 is a graphic representation depicting a further alternative exemplary template for a further alternative exemplary format of a payment indicia string.
Figure 11:
FIG. 11 is a graphic representation depicting a further alternative exemplary template for a further alternative exemplary format of a payment indicia string.

FIG. 10 depicts a further alternative exemplary template for a further alternative exemplary format of a human-readable character string 28 containing the payment indicia string 81. FIG. 11 depicts a further alternative exemplary template for a further alternative exemplary format of a human-readable character string 28 containing the payment indicia string 81. In both of the alternative exemplary embodiments depicted in FIGS. 10 and 11, the human-readable character string 28 is located at the bottom-side of the bar-coded payment indicia 82.

Service Indicators

The invention formats and generates an exemplary Service. Indicator segment composed of two parts, the Service Icon 2*a* and the Service Name 2*b*. It will be understood by someone with ordinary skill in the art that the use herein of the term Service Indicator segment is illustrative of a representation of a set of service indicators; the use of the term "Service Indicator segment" is not a limitation of the invention. The Service Icon 2*a* appears in a one-inch square in the upper left corner of the shipping label 10. Each of the supported services has a unique Service icon to aid in the handling of the package. In the exemplary embodiment of the invention, the letter 'E' (see, for example, element 2*a* in FIG. 1) will be used for Express Mail and the letter 'P' (see, for example, element 2*a* in FIG. 2) for Priority Mail. For Parcel Post, the Service Icon area will be a solid black box (see, for example, element 2*a* in FIG. 3). In the exemplary embodiment of the invention, Service Icons will be one inch (1") square, with light lines bordering the Service Icon area and the Service Icon will be 0.75 inches or more in height.

The Service Name segment 2*b* and Service Name text 2*c* appear below the Payment segment 1. The Service Name segment 2*b* is centered across the shipping label. In the exemplary embodiment of the invention, the Service Name segment 2*b* is bordered above and below by separator lines 11*a*-11*b* to distinguish it from the surrounding segments. In the exemplary embodiment of the invention, Service Name text 2*c* will be formatted and printed in 20 pt. Bold, centered on the label with light lines 11*a*-11*b* above and below and with 1/16th inch clearance above and below the text 2*c* of the name.

Addresses

The next three segments of the exemplary USPS shipping label are the Return and Delivery Address segments, 3 and 4 respectively, and the Package Information segment 5. These three segments will be formatted and generated to appear below the Service Name segment 2*b*. In the exemplary embodiment of the invention, both the Return Address 3 and the Delivery Address 4 will be formatted and generated for printing in all uppercase letters. Further, in the exemplary embodiment of the invention, the invention will format and generate for printing a POSTNET Barcode 20 for the Delivery Address. In the exemplary embodiment of the invention, the POSTNET Barcode 20 will be formatted and generated for printing directly below the City/State/ZIP Code 17-19.

In the exemplary embodiment of the invention, the invention will left justify the Return Address 3 in an approximate font size of 8 pt. in the top left most portion of an Address label block 12 directly below the Service Name segment 2*b*.

In the exemplary embodiment of the invention, the invention will format and generate the Delivery Address with the following format parameters:

1.) The text "SHIP TO:" 13 will be printed beside and to the left of the Delivery address in an approximate 10 pt Bold font;
2.) The Delivery Address segment 4 will be printed below the Return Address segment 3;
3.) A street address 16 should be printed directly above the City/State/ZIP Code 17-19 in an approximate 10 pt font;
4.) City/State/ZIP Code 17-19 will be 14 pt. Bold;
5.) Whenever possible, the ZIP Code will be ZIP+4.

In the exemplary embodiment of the invention, the invention will provide sufficient space for complete Return and Delivery Addresses, 3 and 4 respectively. A. complete delivery address will include, as appropriate:

1.) Addressee name 14 or other identifier and/or firm name 15 where applicable;
2.) Urbanization name (not shown) (Puerto Rico only, ZIP Code prefixes 006 to 009, if area is so designated);
3.) Street number and name 16*a* (including predirectional, suffix, and postdirectional as shown in USPS ZIP+4 File for the delivery address or rural route and box number (RR 5 BOX 10), highway contract route and box number (HC 4 BOX 45), or post office box number (PO BOX 458), as shown in USPS ZIP+4 File for the delivery address);
4.) Secondary address unit designator and number 16*b* (such as an apartment or suite number (APT 202, STE 100));
5.) City and state 17-18 (or authorized two-letter state abbreviation).

The invention will use city names and city and state name abbreviations as shown in USPS City State File; and 6.) Correct 5-digit ZIP Code or ZIP+4 code. If a firm name is assigned a unique ZIP+4 code in the USPS ZIP+4 File, the unique ZIP+4 code will be used in the delivery address.

Package Information

Returning to FIG. 1, the exemplary Package Information label segment 5 is an optional label segment located in the top right corner of the Address block 12. As depicted in FIG. 1, the Package Information label segment 5 contains information to aid in the verification of the rate charged, such as, for example, the package weight 21 (if available) is provided as well as Oversize 22 ("OS"). Non-machinable indicators (24 in FIG. 3) would be provided if appropriate.

Package Weight

Continuing with FIG. 1, for services where the rate is determined in pounds only, the invention will format and generate for printing a package weight 21 that is rounded up from actual package weight to the nearest whole pound. For services where the rate is determined in pounds and ounces, the invention will format and generate for printing a package weight 21 that rounds up the actual weight to the nearest ounce. If the package weighs less than 15 pounds but measures more than 84 inches in combined length and girth and is rated at either the 15 pound rate, or if the package measures more than 108 inches in combined length and girth and is rated at the Oversized rate, the invention will format and generate for printing an Oversize indicator ("OS") 22 next to the weight 21.

In the exemplary embodiment of the invention, the Package weight 21 and Oversized Indicator 22 are right justified and are displayed in a format of either "XXX LBS" or "XX LBS XX OZ", in an approximate font size of 14 pt.

Package Count

Continuing with FIG. 1, a Package Count 23 would be provided. The Package Count 23 has no effect on the movement of packages. The Package Count is provided as a convenience for the shipper to account for packages shipped to the same location using the same service at the same time. The package count 23 indicates the number N of the particular package, related to the number of packages in the entire shipment X. For example: 2 OF 4 where N=2 and X=4. In the exemplary embodiment of the invention, the Package Count 23 appears below Package Weight 21, is right justified and is formatted in an approximate font size of 12 pt.

Non-Machinable Indicator

A Non-machinable Indicator 24 (FIG. 3) is formatted and generated when the package is classified as Non-machinable. The Non-machinable Indicator 24 (FIG. 3) is printed below the Package Count 21 (if provided) in a right justified format in approximate font size of 10 pt.

Tracking Number and Routing Code Barcodes

The Barcode segment 6 and Additional Service Instructions segment 7 will follow the Address block 12. Each USPS service will have a unique barcodes(s) that will apply to the particular service requested by the user. The service-specific requirements for these barcodes can be found in USPS publications as referenced below. The requirements given below are common to all barcodes to be printed.

The Barcode segment 6 will appear below the Address Block 12. In the case of Priority Mail (see FIG. 2), the invention in the exemplary embodiment will format and generate a USPS Delivery Confirmation barcode 30-32. Delivery Confirmation is free if electronically requested for Priority Mail.

For Parcel Post, the exemplary embodiment formats and generates a Delivery Confirmation Barcode which will include a Postal Routing Code. In an embodiment in which Delivery Confirmation is not provided, a Postal Routing Barcode will be printed. Express Mail labels will include an Express Mail Tracking Barcode.

In the exemplary embodiment, the Barcode segment 6 will be bordered on the top and bottom by Bold horizontal lines, 40 and 41 respectively, which extend from side-to-side on the label. In the exemplary embodiment of the invention, the Identification Bars 40-41 will be a minimum thickness of 0.062 inches. In the exemplary embodiment of the invention, text 30 is formatted and generated to be printed above the barcode 31, spaced no less than 0.125 inches or more than 0.5 inches from top Identification Bar 40 and spaced no less than 0.125 inches or more than 0.5 inches from Barcode 31 in a minimum font size of 12 pt. Bold and a preferred 14 pt. Bold font size, in uppercase. If only the Postal Routing Code is printed the word "ZIP" must be printed above the barcode (see 30, FIG. 4). In the exemplary embodiment of the invention, a Tracking Number Barcode will be a minimum of 0.75 inches in height.

Human Readable Text Below Barcode

In the exemplary embodiment of the invention, human readable text 32 will be printed below the Barcode 30. In the exemplary embodiment of the invention, the human readable text 32 will be no less than 0.125 inches and no more than 0.5 inches from Barcode 31; will be no less than 0.125 inches and no more than 0.5 inches from lower Identification Bar 41; and will be formatted in a font 10 pt. Bold. The human-readable text 32 representation of the barcode 30 for Express Mail (FIG. 1) and Delivery Confirmation (FIG. 2) will be parsed into groups of four, with the remaining digits grouped at the end.

Delivery Confirmation barcodes and human readable text will comply with United States Postal Service Publication 91, *Confirmation Services Technical Guide*, Appendix G: Barcode Specifications, which is incorporated in full herein by reference as if fully stated here, and/or with United States Postal Service Delivery Confirmation requirements that are published in the future. Parcel Post labels with Delivery Confirmation will use the UCC/EAN Code 128 data format (Concatenated) as specified in Table 25 (Postal Routing Code with Delivery Confirmation Code) of that document.

Express Mail barcodes and human readable text will comply with United States Postal Service Publication 97, *Express Mail Manifesting Technical Guide*, Appendix F: Barcode Specifications, which is incorporated in full herein by reference as if fully stated here, and/or with United States Postal Service machine-readable code and human readable text requirements that are published in the future.

Postal Routing Codes barcodes will comply with DMM section C850.4.1, incorporated in full herein by reference as if fully stated here.

Additional Service Instructions

The exemplary embodiment of the invention will format the Additional Service Instructions segment 7 to appear on the label below the Tracking Number Barcode segment 6. With the exception of Express Mail, information in this area is optional or dependent on service options.

For Express Mail, the shipping label will contain additional instructions, e.g., 50 (FIG. 1) for the Delivery Unit. The Delivery Unit Instructions, e.g., 50, will appear directly below the lower Tracking Number Identification Bar 41. Additionally, WAIVER OF SIGNATURE: YES (or NO as the case may be) 51 will appear below the Delivery Unit instructions In the exemplary embodiment of the invention, the invention will format and generate Express Mail Additional Instructions 50 using the following format characteristics:

1.) Printed below Tracking Number Identification Bar;
2.) Left justified;
3.) Font Size 8 pt (approx.);
4.) First line text: "ATTENTION DELIVERY UNIT" in Bold font;
5.) A line will be printed between first line and instructions;
6.) Instructions to Delivery Unit are:
a.) "NO EM MAILING LABEL TO REMOVE";
b.) "ALL DELIVERY EMPLOYEES MUST COMPLETE PS FORM 3849"

In the exemplary embodiment of the invention, a Waiver of Signature line will be formatted and generated for printing below Express Mail Additional Instructions in approximately font Size 8 pt Bold.

In the exemplary embodiment of the invention, if other additional instructions are requested, they will be formatted to appear in the upper right corner of the Additional Instructions segment 7 depending on the nature of the instruction. Service Option indicators will only appear if they are not otherwise displayed as part of the Delivery Confirmation Barcode.

Service Options

In the exemplary embodiment of the invention, Service Option indicators, e.g., 61 in FIG. 7, will not be intended to replace the color-coded labeling required for such service options as Certified Mail, Return Receipt, etc. Rather, the Service Option indicators will be intended to supplement the USPS color-coded labels.

In the exemplary embodiment of the invention, Service Option indicators, e.g., 61 in FIG. 7, will be right justified in approximately font size 14 pt Bold. If more than one Service Options indicator is present they will be stacked. Valid Service Options Codes will include:

1.) Collect on Delivery (COD)—"COD"
2.) Insured—"INS"
3.) Certified Mail—"CERT"
4.) Return Receipt—"RCPT"

Vendor Identification

The last segment of information to be printed on a USPS Shipping Label is the Vendor Identification string 71. It is provided as a way to help the USPS identify how a label was produced to ensure quality.

In the exemplary embodiment of the invention, the Vendor Identification string 71 is printed right-justified in uppercase in the lower right corner of the label in approximately 8 pt. font. The Vendor Identification string 71 provides the USPS with information about the Vendor used to produce the label and the printer used to print the label.

In the exemplary embodiment of the invention, the invention formats the Vendor Identification String 71 according to the following format characteristics:

1.) Position 1-4: Vendor ID—assigned by USPS
2.) Position 5: Space
3.) Position 6-10: System Name
4.) Position 11: Space
5.) Position 12-16: System version number
6.) Position 17: Space
7.) Position 18-27: Printer Manufacturer and model number In the exemplary embodiment, it is not necessary to use all positions provided in the Vendor Identification string 71. If positions are not used empty spaces will be removed.

Illustrative Embodiments

Although this invention has been described in certain specific embodiments, many additional modifications and variations would be apparent to those skilled in the art. It is, therefore, to be understood that this invention may be practiced otherwise than as specifically described. Thus, the embodiments of the invention described herein should be considered in all respects as illustrative and not restrictive, the scope of the invention to be determined by the appended claims and their equivalents rather than the foregoing description.

APPENDIX A

Barcode Print Specifications

Dimensions

The preferred range of widths of narrow bars and spaces is 0.015 inch to 0.017 inch. The width of any narrow bars or spaces must not be less than 0.013 inch, or no greater than 0.021 inch. All bars must be at least 0.75 inch high.

The ratio of wide-to-narrow element widths for 1 2 of 5 and Code 39 symbologies referred to as "N" must be 2.5 to 3.0 inclusive.

Clear Zone

No printing may appear in an area 0.125 inch above or below the barcode. A minimum clear zone (also called quiet zone) equal to 10 times the average measured narrow element (bar or space) width shall be maintained on either side of the barcode per Automatic Identification Manufactures International, Inc. (AIM) specifications. When feasible, a left/right clear zone of 0.250 inches is recommended.

Reflectance

When measured in the red spectral range between 630 nanometers and 675 nanometers, the minimum white space reflectance (Rs) must be greater than 50%, and the maximum bar reflectance (Rb) must be less than 25%. The minimum print reflectance difference (Rs−Rb) is 40%. The measurements must be made using a USPS-specified reflectance meter or a USPS-approved barcode verifier.

Barcode Quality

At least 70% of the barcodes must measure American National Standards Institute (ANSI) grade A or B, and none of the remaining portion can measure lower than ANSI grade C.

Information concerning ANSI barcode guidelines are in standard X3.182-1990, *Bar Code Print Quality Guideline, and may be obtained from:*

AMERICAN NATIONAL STANDARDS INSTITUTE
11 W 42ND ST
NEW YORK NY 10036-8002
Telephone: (212) 642-4900
Web site: www.ansi.org Specifications AIM, Inc. offers written technology standards for the barcode symbologies used for EMM:

Uniform Symbology Specification, USS Code 128
Uniform Symbology Specification (USS) Code Interleaved 2-of-5
Uniform Symbology Specification, USS Code 39
These specifications can be obtained from:
AIM INC.
634 ALPHA DRIVE
PITTSBURGH PA 15238-2802
Telephone: (412) 963-8588 (ask for Technical Department)
Web site: www.aimi.org

What is claimed is:

1. A method for generating by a computer an electronic representation of a United States Postal Service shipping label, the method comprising:

generating by a computer an electronic representation of paid United States Postal Service postage indicia, wherein said electronic representation of paid United States Postal Service postage indicia comprises an electronic representation of an indication that postage has been paid to the United States Postal Service;

generating by a computer an electronic representation of a United States Postal Service shipping service type selected from the group consisting of: an identifier for a United States Postal Service express delivery service, an identifier for a United States Postal Service priority delivery service, an identifier for a United States Postal Service parcel post delivery service, an identifier for a United States Postal Service international express delivery service, and an identifier for a United States Postal Service international priority delivery service;

generating by a computer an electronic representation of a ship-to address; and generating by a computer an electronic representation of a corresponding machine- readable United States Postal Service shipping service processing option identifier, said corresponding machine-readable United States Postal Service shipping service processing option identifier selected from a group consisting of: a tracking identifier for a United States Postal Service express delivery service, a delivery confirmation identifier for a United States Postal Service delivery of an item, and a United States Postal Service postal routing identifier, wherein said electronic representation of the United States Postal Service shipping label comprises an indication of a correspondence in a shipping label provider computer system that produced said electronic representation of said United States Postal Service shipping label between said paid United States Postal Service postage indicia and said corresponding machine-readable United States Postal Service shipping service processing option identifier, and wherein said electronic representation of the United States Postal Service shipping label is formatted for printing via a remote client computer to a printer device associated with the remote client computer.

2. The method of claim 1, wherein said electronic representation of the United States Postal Service shipping service type corresponds to an express service offered by the United States Postal Service, and wherein said method further comprises:

generating by a computer an electronic representation of a machine-readable United States Postal Service express tracking code.

3. The method of claim 1, wherein said electronic representation of the United States Postal Service shipping label further comprises a printable United States Postal Service shipping label that is formatted by a computer for printing the electronic representation of machine-readable paid United States Postal Service postage indicia, the representation of a United States Postal Service shipping service type, and the representation of a ship-to address on a single sheet of printing material.

4. The method of claim 1, wherein said electronic representation of a corresponding machine-readable United States Postal Service shipping service processing option identifier is a United States Postal Service Delivery Confirmation identifier.

5. The method of claim 2, wherein the electronic representation of paid United States Postal Service postage indicia comprising an electronic representation of an indication that postage has been paid to the United States Postal Service postage, comprises the sole and exclusive representation in the electronic representation of the United States Postal Service shipping label that postage has been paid to the United States Postal Service.

6. The method of claim 1, wherein said electronic representation of a corresponding machine-readable United States Postal Service shipping service processing option identifier is a United States Postal Service express tracking identifier.

7. The method of claim 1, wherein said electronic representation of a corresponding machine-readable United States Postal Service shipping service processing option identifier is a United States Postal Service postal routing identifier.

8. The method of claim 1, wherein said indication of said correspondence in said shipping label provider computer system comprises an existence in said electronic representation of said United States Postal Service shipping label of both said electronic representation of said paid United States Postal Service postage indicia and said corresponding machine-readable United States Postal Service shipping service processing option identifier.

9. The method of claim 1, wherein said indication of said correspondence in said shipping label provider computer system comprises both said electronic representation of said machine-readable paid United States Postal Service postage indicia and said electronic representation of said corresponding machine-readable United States Postal Service shipping service processing option identifier being provided in said electronic representation of said United States Postal Service shipping label.

10. A method for generating by a computer an electronic representation of a United States Postal Service shipping label, the method comprising:

generating by a computer an electronic representation of paid United States Postal Service postage indicia, wherein said electronic representation of paid United States Postal Service postage indicia comprises an electronic representation of an indication that postage has been paid to the United States Postal Service;

generating by a computer an electronic representation of a United States Postal Service shipping service type selected from the group consisting of: an identifier for a United States Postal Service express delivery service, an identifier for a United States Postal Service priority delivery service, an identifier for a United States Postal Service parcel post delivery service, an identifier for a United States Postal Service international express delivery service, and an identifier for a United States Postal Service international priority delivery service;

generating by a computer an electronic representation of a ship-to address; and generating by a computer an electronic representation of a corresponding machine-readable United States Postal Service shipping service processing option identifier, said corresponding machine-readable United States Postal Service shipping service processing option identifier comprising at least one of: a United States Postal Service tracking identifier, and a United States Postal Service postal routing identifier; and generating by a computer an electronic representation of a machine-readable barcode separate from said paid United States Postal Service postage indicia, said machine-readable barcode comprising content that corresponds with said United States Postal Service shipping service type, said content comprising information identifying a mail class or a United States Postal Service product.

11. The method of claim 10, said method further comprising formatting by a computer said electronic representation of a United States Postal Service shipping label for printing via a remote client computer to a printer device associated with the remote client computer.

12. The method of claim 10, wherein said indication of said correspondence in said shipping label provider computer system comprises both said electronic representation of said machine-readable paid United States Postal Service postage indicia and said electronic representation of said corresponding machine-readable United States Postal Service shipping service processing option identifier having been generated by said shipping label provider computer system in said electronic representation of said United States Postal Service shipping label.

13. A United States Postal Service shipping label printed on a substrate, said United States Postal Service shipping label comprising:

machine-readable, bar-coded, information-based postage indicia that indicates that postage has been paid to the United States Postal Service;

a United States Postal Service shipping service type selected from the group consisting of: an identifier for a United States Postal Service express delivery service, an identifier for a United States Postal Service priority delivery service, an identifier for a United States Postal Service parcel post delivery service, an identifier for a United States Postal Service international express delivery service, and an identifier for a United States Postal Service international priority delivery service;

a ship-to address;

a corresponding machine-readable United States Postal Service shipping service processing option identifier, said corresponding machine-readable United States Postal Service shipping service processing option identifier selected from a group consisting of: a tracking identifier for a United States Postal Service express delivery service, a delivery confirmation identifier for a United States Postal Service delivery of an item, and a United States Postal Service postal routing identifier; and a machine-readable barcode separate from said machine-readable, bar-coded, information-based postage indicia, said machine-readable barcode comprising content that corresponds with said United States Postal Service shipping service type, said content comprising information identifying a United States Postal Service shipping service type code.

* * * * *